United States Patent [19]

Wright

[11] Patent Number: 4,788,433

[45] Date of Patent: Nov. 29, 1988

[54] ULTRAVIOLET LIGHT MONITORING DEVICE AND METHOD OF MAKING SAME

[75] Inventor: Thomas C. Wright, 516 Cavendis, Arlington, Tex. 76015

[73] Assignee: Thomas C. Wright, La Jolla, Calif.

[21] Appl. No.: 2,389

[22] Filed: Jan. 12, 1987

[51] Int. Cl.$^4$ ............................................... G01J 1/48
[52] U.S. Cl. ............................. 250/474.1; 250/482.1
[58] Field of Search .............. 250/474.1, 473.1, 472.1, 250/482.1

[56] References Cited

U.S. PATENT DOCUMENTS

| | | | |
|---|---|---|---|
| 3,194,963 | 7/1965 | McKee | 250/474.1 |
| 3,886,415 | 5/1975 | Genthe | 174/68.5 |
| 3,903,423 | 9/1975 | Zweig | 250/474.1 |
| 4,187,424 | 2/1980 | Inoue et al. | 378/32 |
| 4,247,575 | 1/1981 | O'Connell et al. | 427/2 |

Primary Examiner—Carolyn E. Fields
Attorney, Agent, or Firm—Bernard L. Kleinke

[57] ABSTRACT

An ultraviolet light sensitive emulsion material, which becomes transparent to the user only after the ultraviolet light sensitive emulsion material is exposed to a predetermined amount of ultraviolet light, to expose a colored backing surface to view. In one form of the invention, an ultraviolet light inhibiting material is disposed in covering or blocking relationship relative to the emulsion material arranged in a graduated pattern of varying opacity, for inhibiting passage of ultraviolet light selectively to the ultraviolet light sensitive emulsion material to enable the emulsion to be rendered transparent in a series of graduated indications when the device is exposed to progressively longer periods of time.

20 Claims, 2 Drawing Sheets

4,788,433

ULTRAVIOLET LIGHT MONITORING DEVICE AND METHOD OF MAKING SAME

TECHNICAL FIELD

This invention relates generally to the monitoring of ultraviolet light, and more particularly to a device for monitoring cumulative exposure to ultraviolet light.

BACKGROUND ART

Outdoor sunbathing and indoor tanning saloons, outdoor employment such as construction and farming and various forms of indoor employment like arc welding expose the surfaces of the skin to high levels of ultraviolet light. Such exposure may be dangerous. As reported by the American Cancer Society, there is a definite correlation between over-exposure to sunlight (solar ultraviolet light), or man made sources of ultraviolet light, and skin cancer. In this regard, the American Cancer Society recommends maximum cumulative exposure limits for specified periods, such as a week or month. Therefore, it is prudent to guard against cancer-producing over-exposure.

Existing techniques for determining exposure to ultraviolet light have suffered from a common drawback. They do not enable measurement of cumulative exposure to ultraviolet light over a series of episodes. Instead, existing techniques have included sunscreen ointments applied to the exposed skin to inhibit or reduce greatly the passage of ultraviolet light to the skin. Such techniques have also included electrical and electronic alarming devices for providing indications when a pre-determine exposure level has been reached during any one continuous exposure time.

Thus, existing techniques do not enable individuals to monitor the cumulative amount of ultraviolet exposure received in a number of episodes. Although exposure may be limited to a safe level at any one sitting, the danger of cumulative overexposure remains ever present.

Consequently, it is desirable to have a new and improved device for monitoring the cumulative total amount of exposure to ultraviolet light, starting from any desired time, from repeated individual exposure episodes. The device should be inexpensively manufacturable, require little skill to use, and provide a convenient indication of accumulated exposure in a readily discernible manner.

SUMMARY OF THE INVENTION

Therefore, the principal object of the invention is to provide a new and improved device for monitoring the cumulative total amount of ultraviolet light exposed thereto for repeated exposure episodes.

It is another object of the present invention to provide such a device, which indicates the relative amount of accumulated ultraviolet light exposure, and which is inexpensively manufacturable.

It is a further object to provide such a device, which requires little skill to use, while providing a convenient indication of relative accumulated exposure by a person even in bright light.

It is a further object to provide such a device, which can be retained for historical records of exposure to ultraviolet light.

Briefly, the above and further objects of the present invention are realized by providing a device for monitoring repeated exposures to ultraviolet light. The device is relatively inexpensive to manufacture, so that it can be marketed as a disposable item.

The device includes an ultraviolet light sensitive emulsion material, which becomes transparent to the view of the user only after the emulsion material is exposed to a predetermined amount of ultraviolet light. This transparency exposes a colored backing material surface to the view of the user. In one form of the invention, an ultraviolet light inhibiting material (opague masking) is disposed in a graduated pattern in a covering or blocking relationship relative to the emulsion material below it. The light inhibiting material is disposed in various degrees of opacity so it will conform to the different skin sensitivities established by the American Cancer Society. The ultraviolet light sensitive emulsion material when exposed through the inhibiting material becomes transparent, exposing a graduated colored backing material that indicates the amount of exposure over progressively longer periods of time. Thus, the device provides an indication of the relative cumulative amounts of ultraviolet light exposed thereto.

Thus, the device of this invention provides an indication of the ultraviolet light exposure to have accumulated over a series of individual exposure episodes, to help the user know when an accumulated amount of ultraviolet light in a given period of time has reached a dangerously high level for a given period of time, such as several days or weeks.

BRIEF DESCRIPTION OF THE DRAWINGS

The above and further objects and features of this invention, and the manner of attaining them, will become apparent, and the invention itself will be best understood, by reference to the following description of an embodiment of the invention taken in conjunction with the accompanying drawings, wherein.

BEST MODE FOR CARRYING OUT THE INVENTION

Figure 1:
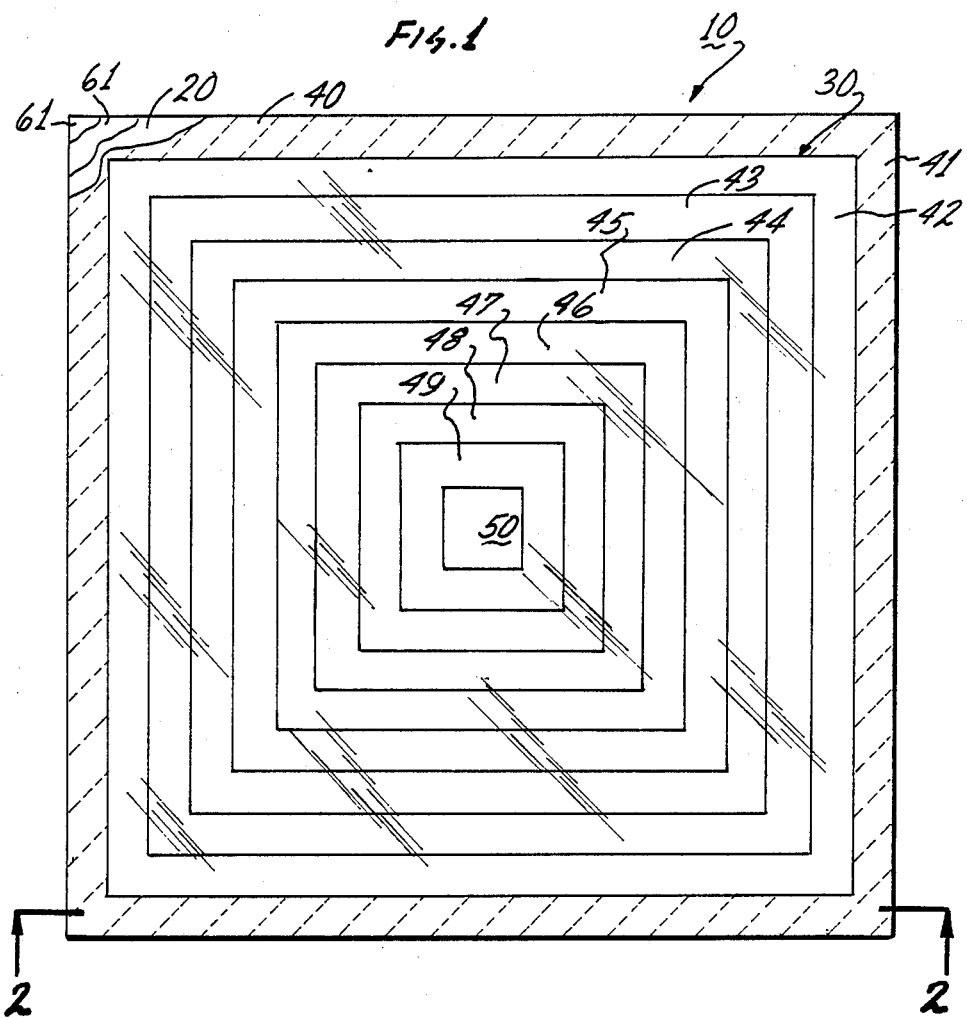
FIG. 1 of the drawings is a fragmentary plan or face view of an ultraviolet light detection device constructed according to the invention.
Figure 2:
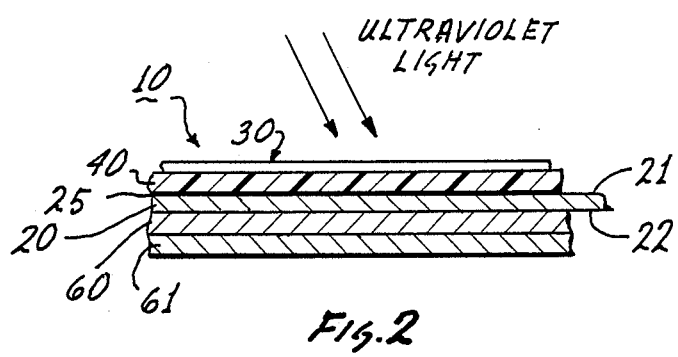
FIG. 2 is an enlarged transverse sectional view of a portion of the device of FIG. 1.

Referring now to FIGS. 1 and 2 of the drawings, there is shown an ultraviolet light monitoring device 10, which is constructed according to the invention. The device 10 is preferably a thin patch and is adapted to be worn by the user during repeated exposures to ultraviolet light, and should the accumulated amount thereof be greater than a predetermined amount, indications of same are provided to the user.

The device 10 includes a generally thin, flat base member 20 having a generally flat front surface 21 and a generally flat rear surface 22. The front surface 21 is a colored surface, and is of a desired color, such as red. As will become apparent to those skilled in the art, other suitable color may also be employed.

An ultraviolet light sensitive means of emulsion material 25 is disposed on the front surface 21 to conceal it from view, and is preferably a diazodimethylaniline crystal compound. Other suitable ultraviolet light sensitive emulsion materials, such as silver nitrates, may also be employed.

The emulsion material 25 is in the form of a thin coating on the base member 20, and covers the front surface 21 to prevent it from becoming visible to the user, until the ultraviolet light sensitive emulsion material 25 is exposed to a predetermined amount of ultraviolet light to be rendered transparent.

An ultraviolet filter means or coating of light inhibiting material or masking 40 is disposed in overlying relationship with the front face of the emulsion material 25. A protective translucent member or film 30, preferably composed of mylar plastic material film (polyethylene terephthalate), is disposed in overlying relationship with the front face of the inhibiting masking 40. The inhibiting masking 40 is affixed to the translucent member 30, by suitable means such as by silk screening or printing.

The filter means 30 is affixed to the perimeter of the base member 20, with the emulsion material 25 interposed therebetween by suitable known techniques, such as by sonic or fusion welding, or adhesives. The affixing of these surfaces forms a moisture proof seal, for protecting the ultraviolet light sensitive emulsion material 25. The translucent material 30 enables the user to view the ultraviolet light sensitive emulsion material 25 therethrough.

Thus, the colored base member 20 becomes visible to a user, only after the ultraviolet light sensitive emulsion material 25 is exposed for a sufficiently long period of time, either continuously or intermittently, to sufficient ultraviolet light. Such visibility occurs only after sufficient ultraviolet light passes through the translucent material 30 and the inhibiting material 40 according to the filtering characteristics of the inhibiting material 40.

Prior to ultraviolet light exposure, the greyish or yellowish emulsion material 25 is visible to the user. After such exposure, a color change occurs, due to the known photochemical reaction with the material 25, and thus the contrasting red color of the surface 21 is exposed to view through the portion of the emulsion material 25 rendered transparent.

The inhibiting material 40 is arranged in a graduated pattern of concentric printed areas disposed on the emulsion material 25, to define a series of progressively smaller sized rectangularly-shaped, concentric areas 41 through 50. Each one of the rectangularly-shaped areas has a different density of inhibiting material 40 to achieve a graduated pattern of correspondingly varying opacity.

The concentration of ultraviolet inhibiting material of the largest area 41 is the smallest, and the intermediate areas 42 through 49 include progressively heavier concentrations of ultraviolet inhibiting material. The central, smallest area 50 has the heaviest concentration.

As a result of the variation of density of inhibiting material, the area 41 permits the ultraviolet light sensitive emulsion material 25 to become transparent first in the area defined by the area 41, before the other areas of heavier concentration. After accumulated exposure to ultraviolet light reaches about 10% of the recommended maximum, the area 41 appears to change from the yellowish or greyish color of the emulsion material 25 to the color red of the base member 20. Similarly, the density of the inhibiting material 40 deposited in the area 42, is such that the photographic emulsion material 25 reacts with the ultraviolet light to render it transparent, after exposure to about 20% of the recommended maximum exposure of ultraviolet light.

Likewise, each of the other areas 43–50 are composed of varying densities of inhibiting material to result in the base member 20 becoming incrementally more visible in the respective areas, as the cumulative exposure of the device 10 to ultraviolet radiation, whereby incremental, discrete visual indications become discernible, in 10% increments of the recommended maximum exposure. When the exposure level for the interval of time has been reached, the base member is visible in the area 50, so that substantially the entire surface 21 of the base member 20 is visible as an indication that the recommended maximum exposure level has been reached, and thus any further exposure within that interval would not be advisable due to the risk to the user.

When this occurs, the device 10 may be discarded or saved for an historical record and a new one used. The device 10 provides a very convenient, easy to use and inexpensive to manufacture device for monitoring ultraviolet light exposure.

The device 10 is fabricated in sheets, to produce a large laminated structure, which is die cut into conveniently-sized patches, such as the illustrated one-inch square. Prior to die cutting, a contact adhesive 60, covered by a silicon, peel-off backing strip 61, is affixed by suitable conventional techniques to a rear surface 22 of the base member 20. The resulting one-inch square patches are thus easily attached to the user's skin or clothing in a position exposed to the sun or other source of ultraviolet radiation, by peeling off the backing strip 61 and pressing the adhesive 60 against a desired support surface. When the user is no longer exposed to ultraviolet light, following an exposure episode, the user removes the device 10 and places it in a pouch provided, which is totally opaque, for future continued use at a later date and/or for an historical record.

When the surface 21 of the base member 20 becomes fully visible to indicate the maximum recommended accumulated total exposure, the device 10 may be discarded or saved for an historical record and a new one employed.

The concentration of the ultraviolet light sensitive emulsion material 25, and/or the density of the inhibiting material 40, may be varied in different models of the device 10 so that the device responds to different accumulated totals of ultraviolet light exposure. Thus, different models of device 10 may be used by persons having a variety of skin sensitivities. For example, someone with very sensitive skin, all of the concentrations would be lighter in concentration as compared to the concentrations employed for use by people having less sensitive skin.

Although the illustrated embodiment employs a square configuration and an arrangement of ten concentric square areas, it is within the inventive concepts herein disclosed, to employ various different other shapes and arrangements. For example, the inhibiting material 40 can be silk screened on the emulsion material 25 in a series of graphic areas configured in the shape of cartoon characters, for use by children.

Furthermore, the device 10 need not be restricted to a thin sheet or similar structure. The surface 21 may be any selected surface, upon which the other described components are attached in the layered relationship described.

If desired, instead of the front surface 21 of the base member 20 being of a single color, different colors may be used in concentric areas aligned with the concentric areas 41 through 50 of the inhibiting material 40. Each colored area would be of the same size and shape as its corresponding one of the areas 41 through 50, and would be disposed in registration therewith. Thus, various different color changes would occur incrementally when the device is exposed to ultraviolet radiation for longer periods of time.

Figure 3:
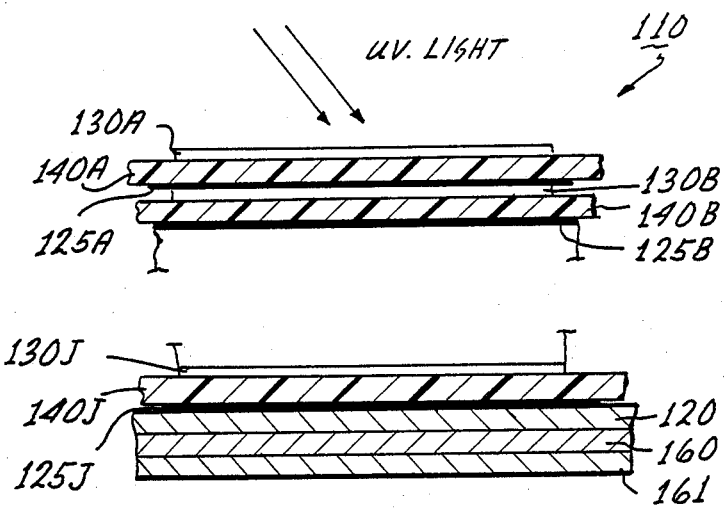
FIG. 3 is an enlarged transverse sectional view of a portion of another ultraviolet light detection device.
Figure 4:
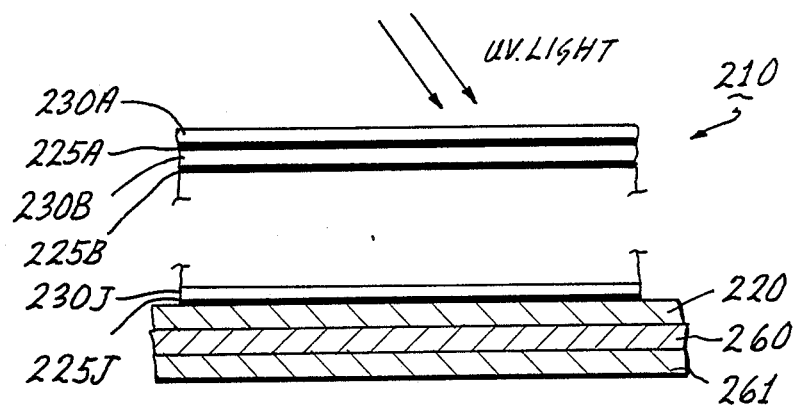
FIG. 4 is an enlarged transverse sectional view of a portion of yet another ultraviolet light detection device.

Referring now to FIGS. 3 and 4, there is shown two other embodiments of the monitoring device, for use in situations of high intensity ultraviolet light exposures. In these instances, for instance when the source 50 ultraviolet light is arc welded, the device 10 would not be adequate for use, since the high intensity ultraviolet light would cause the complete surface of the emulsion material 25 to become totally visible to the user, instantaneously after a single exposure.

Wherefore, there is a need to modify the monitoring device 10 to render it usable as an industrial safety device. This is achieved by other light monitoring devices such as devices 110 and 210, which will be described later in greater detail, and which prevent the emulsion material 25 from becoming transparent, instantaneously after a single exposure to a source of high intensity ultraviolet light.

FIG. 3 illustrates another light monitoring device 110 constructed in accordance with the invention, with reference numerals increased by 100 over reference numerals designating similar components of the device 10. The monitoring device 110 generally comprises alternate superposition of several translucent films 130 A-J, inhibiting maskings 140 A-J and emulsion material layers 125 A-J. The bottom emulsion material layer 125J is disposed in overlying relationship with a contact adhesive 160 and a peel-off backing strip 161.

The concentration of ultraviolet inhibiting material is much heavier than that of the inhibiting masking 40, in order to inhibit the higher intensity of ultraviolet light from reaching the emulsion material layers 125 A-J.

After the accumulated exposure to ultraviolet light reaches about 10% of the recommended maximum, the first or upper layer of emulsion material 125A becomes transparent, thus allowing the ultraviolet to get through to the second layer of inhibiting masking 140B, and emulsion material layer 125B. Similarly, after exposure to about 20% of the recommended maximum level of ultraviolet light, the second layer of emulsion material 125B reacts with the ultraviolet light to be rendered transparent and to allow passage of ultraviolet light to the underlying layers.

Throughout this gradual process, the device 110 appears to have the yellowish or greyish color of the emulsion material 125A. Once the last layers of translucent film 130J, inhibiting masking 140J and emulsion material 125J are exposed to the ultraviolet light, the red color of the base member 120 becomes apparent to the user. Such change in color would act as a warning to the user, that he or she has been exposed to the maximum periodic exposure of ultraviolet light.

FIG. 4 illustrates yet another light monitoring device 210, with reference numerals increased by 200 over reference numerals designating similar components of the device 10. The basic difference between the monitoring device 110 of FIG. 3 and the monitoring device 210 of FIG. 4, is that the intermediary superposed layers of the embodiment of FIG. 3 comprise several inhibiting maskings 140 A-J, while the embodiment of FIG. 4 does not.

The monitoring device 210 operates in a similar manner to the device 110. The upper superposed emulsion material 225A becomes transparent when exposed to an accumulated exposure to ultraviolet light of about 10% of the recommended maximum. This process is repeated for all the remaining superposed layers of emulsion material 225 B-J, until the base member 220 becomes exposed and visible. Thus, revealing a change in color of the monitoring device 210, warning the user of the potential over-exposure risks.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A device for monitoring exposure to ultraviolet light, comprising:
    a base having a front surface, said surface being of a certain color; and
    ultraviolet light sensitive means disposed on said surface and being of a different opaque color relative to said color of said surface for concealing it from view, and for becoming transparent when exposed to ultraviolet light for a predetermined period of time.

2. A device as recited in claim 1, further including filter means disposed in overlying relationship relative to light sensitive means for inhibiting passage selectively of ultraviolet light thereto to cause said light sensitive material to be rendered transparent only after it has been exposed to a predetermined quantity of ultraviolet light.

3. A device as recited in claim 2, which further comprises a protective layer of translucent material disposed in overlying relationship relative to the filter means.

4. A device as recited in claim 3, wherein inhibiting material is arranged in separate discrete areas, having different concentrations thereof to cause said first surface to be exposed to view incrementally and progressively as the device is exposed to ultraviolet light for longer periods of time.

5. A device as recited in claim 4, further including adhesive means connected to the device for attaching the base member removably to a support surface.

6. A device as recited in claim 5, wherein said adhesive means includes a silicon peel-off strip.

7. A device as recited in claim 4, wherein said discrete areas are arranged in a concentric pattern.

8. A device as recited in claim 1, wherein said front surface is colored red.

9. A device as recited in claim 1, wherein said light sensitive material includes a ultraviolet light sensitive emulsion material.

10. A device as recited in claim 9, wherein said emulsion material includes a crystal compound composed of diazodimethylaniline crystals.

11. A device as recited in claim 3, wherein the translucent material is composed of a polyethylene terephthalate plastic film material.

12. A device as recited in claim 7, wherein said pattern of discrete areas is so constructed and arranged that said light sensitive material is rendered visible in a series of ten gradations indicative of ten percent increments in the cumulative amount of ultraviolet light exposure.

13. A device as recited in claim 12, wherein the maximum opacity of the gradations of ultraviolet light inhibiting material passes the predetermined amount of ultraviolet light to said ultraviolet light sensitive means when exposure to ultraviolet light reaches a specified maximum for a period of time.

14. A device as recited in claim 1, wherein said ultraviolet light sensitive means comprises a plurality of alternately disposed layers of emulsion material and translucent material.

15. A device as recited in claim 14, which further comprises a plurality of filter means, alternately disposed between said layers of emulsion material and said layers of translucent material.

16. A method of making a device for monitoring exposure to ultraviolet light, comprising:
   using a generally flat base member having first and second surfaces;
   covering the first surface with an ultraviolet light sensitive photographic emulsion material so that the first surface becomes visible to a user in such a manner to indicate a certain exposure to ultraviolet radiation only after the photographic emulsion material is exposed to a predetermined amount of ultraviolet light;
   depositing an ultraviolet light inhibiting material on a translucent material in a graduated pattern of varying density; and
   fusing the base member and the inhibiting material together with the ultraviolet light sensitive emulsion material in between to form a laminated structure.

17. A method as recited in claim 16, further comprising:
   cutting the laminated structure into rectangularly-shaped members; and
   affixing an adhesive backing to the second surface of each member for use in attaching the member to a user's skin or clothing.

18. A method as recited in claim 16, further comprising:
   silk screening a desired pattern of ultraviolet light inhibiting material on the emulsion material.

19. A method as recited in claim 16, wherein:
   the step of fusing includes fusing by sonic welding.

20. A device for monitoring exposure to ultraviolet light, comprising:
   a generally flat base member having a first outer surface to be viewed by a user and a second outer surface;
   adhesive means attached to the second surface for attaching the base member removably to the skin or clothing of the user;
   ultraviolet light sensitive means, including an ultraviolet light sensitive photographic emulsion material disposed upon the first surface so that the first surface becomes visible to the user only after the ultraviolet light sensitive emulsion material is exposed to a predetermined amount of ultraviolet light;
   filter means, including an ultraviolet light inhibiting material juxtaposed in overlying relationship relative to said light sensitive means, and having a graduated pattern of varying opacity, for inhibiting passage selectively of ultraviolet light to the ultraviolet light sensitive emulsion material according to the graduated pattern, to cause the first surface to become exposed to view in a series of gradations indicative of a cumulative amount of ultraviolet light exposure;
   a protective translucent material disposed over said filter means; and
   said filter means and base member being bonded together with said emulsion material disposed therebetween.

* * * * *